(12) United States Patent
Klaas et al.

(10) Patent No.: US 10,982,728 B2
(45) Date of Patent: Apr. 20, 2021

(54) ADJUSTMENT MECHANISM FOR A VEHICLE DISK BRAKE AS WELL AS A CARDANIC ROTARY BEARING AND A COUPLING RING THEREFOR

(71) Applicant: BPW Bergische Achsen KG, Wiehl (DE)

(72) Inventors: Thomas Klaas, Reichshof (DE); Andreas Damberg, Nümbrecht (DE); Udo Weber, Morsbach (DE)

(73) Assignee: BPW Bergische Achsen KG, Wiehl (DE)

( * ) Notice: Subject to any disclaimer, the term of this patent is extended or adjusted under 35 U.S.C. 154(b) by 268 days.

(21) Appl. No.: 16/087,679

(22) PCT Filed: Mar. 2, 2017

(86) PCT No.: PCT/DE2017/100163
§ 371 (c)(1),
(2) Date: Sep. 24, 2018

(87) PCT Pub. No.: WO2017/162229
PCT Pub. Date: Sep. 28, 2017

(65) Prior Publication Data
US 2020/0291995 A1 Sep. 17, 2020

(30) Foreign Application Priority Data
Mar. 24, 2016 (DE) .................. 10 2016 105 611.1

(51) Int. Cl.
*F16C 27/06* (2006.01)
*F16D 65/56* (2006.01)
(Continued)

(52) U.S. Cl.
CPC ....... *F16D 65/567* (2013.01); *F16D 55/2255* (2013.01); *F16D 65/52* (2013.01);
(Continued)

(58) Field of Classification Search
CPC .......... F16D 65/56; F16H 55/18; F16H 48/08; F16C 27/06
(Continued)

(56) References Cited

U.S. PATENT DOCUMENTS 3,486,394 A * 12/1969 Heidrich ................... F16H 1/08
74/458
4,612,816 A * 9/1986 Chalik .................... F16H 55/18
74/401
(Continued)

FOREIGN PATENT DOCUMENTS

DE 102 60 597 7/2004
DE 10 2005 018 157 10/2006
(Continued)

*Primary Examiner* — Christopher P Schwartz
(74) *Attorney, Agent, or Firm* — Gudrun E. Huckett

(57) ABSTRACT

The invention relates to an adjustment mechanism for a vehicle disk brake, which is provided with an adjustment device for compensating the operation-induced wear on the brake linings and the brake disk, wherein the adjustment device has the following components: —a drive element (25) which is rotatably arranged within the housing of the disk brake on an axis (A) parallel to the axis of rotation of the brake disk and which can be set in rotation by a brake application device; —a shaft (40) which is arranged centrally on the axis (A), on which the drive element (25) is rotatably mounted; —a cardanic rotary bearing (45) which supports the shaft (40) in an opening (1A) of the housing in a pendulum-like manner and which is made at least partially of a deformable rubber or elastomer ring (46) and a steel ring (47) which is attached therein. In order to further develop the mentioned adjustment mechanism so that it can be produced more economically and requires only a small number of components, the steel ring (47) is supported in a sliding manner against a cylindrical bearing section (50) of the shaft (40), and a coupling consisting of a first coupling part (51), (Continued)

which is rotationally fixed to the shaft (40), and a second coupling part (52), which is rotationally fixed to the steel ring (47), is arranged on the axis (A), the second coupling part being a coupling ring (52) which is rotatably mounted on the shaft (40). The invention further relates to a corresponding cardanic rotary bearing (45) and a corresponding coupling ring (52).

28 Claims, 5 Drawing Sheets

(51) Int. Cl.
*F16D 55/2255* (2006.01)
*F16D 65/52* (2006.01)
*F16D 125/22* (2012.01)
*F16D 125/64* (2012.01)
*F16D 127/00* (2012.01)
*F16D 127/04* (2012.01)

(52) U.S. Cl.
CPC ...... *F16D 2125/22* (2013.01); *F16D 2125/64* (2013.01); *F16D 2127/004* (2013.01); *F16D 2127/04* (2013.01)

(58) Field of Classification Search
USPC ............. 188/71.7–71.9, 72.7–72.9, 196 B, 188/196 BA, 196 V; 74/401, 458; 384/147, 151; 277/551, 561, 568, 572
See application file for complete search history.

(56) References Cited

U.S. PATENT DOCUMENTS

| | | | | |
|---|---|---|---|---|
| 4,628,753 A * | 12/1986 | Heine | ............ | F16H 48/08 475/220 |
| 5,320,587 A * | 6/1994 | Bodtker | ............ | F16H 48/08 29/432 |
| 5,353,896 A * | 10/1994 | Baumgartner | ........ | F16D 55/226 188/71.9 |
| 5,380,016 A * | 1/1995 | Reinsma | ............ | F16J 15/3208 277/503 |
| 6,417,211 B1 * | 7/2002 | Petigard | ............ | A01N 43/80 514/372 |
| 7,854,995 B1 * | 12/2010 | Anderson | ............ | B21K 1/305 428/546 |
| 7,857,335 B2 | 12/2010 | Wilfried | | |
| 8,739,945 B2 * | 6/2014 | Iraschko | ............ | F16D 65/56 188/196 V |
| 10,240,677 B2 * | 3/2019 | Angiulli | ............ | F16J 15/3268 |
| 2008/0149450 A1 * | 6/2008 | Christoffer | ............ | F16D 23/025 192/53.34 |
| 2011/0262063 A1 * | 10/2011 | Dittmar | ............ | F16C 33/805 384/147 |
| 2013/0285333 A1 * | 10/2013 | Foti | ............ | D06F 37/00 277/562 |
| 2015/0068852 A1 | 3/2015 | Weber et al. | | |
| 2015/0192181 A1 | 7/2015 | Asen et al. | | |

FOREIGN PATENT DOCUMENTS

| | | |
|---|---|---|
| DE | 10 2006 031 738 | 1/2008 |
| DE | 10 2007 007 493 | 8/2008 |
| EP | 0 531 321 | 12/1991 |
| EP | 1 985 475 | 10/2008 |
| FR | 1 560 109 | 3/1969 |
| FR | 2 932 237 | 12/2009 |
| GB | 1 225 666 | 3/1971 |
| WO | 92/00466 | 1/1992 |
| WO | 2008/072742 | 6/2008 |
| WO | 2013/171342 | 11/2013 |
| WO | 2015/117601 | 8/2015 |

\* cited by examiner

ADJUSTMENT MECHANISM FOR A VEHICLE DISK BRAKE AS WELL AS A CARDANIC ROTARY BEARING AND A COUPLING RING THEREFOR

BACKGROUND OF THE INVENTION

The invention relates to an adjustment device for a vehicle disk brake which for offsetting the operationally-induced wear on the brake pads and the brake disk is provided with a readjustment device, wherein parts of the readjustment device are a drive element, which is rotatably arranged within the housing of the disk brake on an axis, and which can be set in rotation by a brake clamping device; a shaft centrally arranged on the axis, relative to which the drive element is rotatably mounted; a cardanic pivot bearing which is capable of self-aligningly supporting the shaft in an opening of the housing, which consists at least of a deformable rubber or elastomer ring and a steel ring fastened therein. The invention further relates to a cardanic pivot bearing that is suitable for the adjustment device and is comprised of a deformable rubber or elastomer ring, which on the inside is connected to a first steel ring with a cylindrical slide bearing surface formed on the inside of the same, and on the outside is connected to a second steel ring for fastening the pivot bearing in an assembly opening. The invention relates also a coupling ring that is suitable for the adjustment device and is provided with an annular opening, a face-end annular surface and at least one further annular surface, which is provided with coupling structures in the form of ramps that are arranged evenly distributed over the circumference.

From EP 0 531 321 B1, WO 2015/117601 A1 and DE 102 60 597 B, vehicle disk brakes are known, which for offsetting the operationally-induced wear on the brake pads and on the brake disk are provided with a readjustment device. The same gradually adapts the distance between the brake pads and the brake disk corresponding to the increasing wear and thereby maintains this so-called clearance within a limit defined by the design. The actuation of the readjustment device is effected via a drive element which is rotatably arranged in the housing of the disk brake on an axis that is parallel to the rotational axis of the brake disk. By way of the brake clamping device of the disk brake, the drive element is set in rotation, e.g. by a pivot lever arranged in the brake housing which amplifies the brake force. The drive element of the readjustment device is rotatably mounted on a centrally arranged shaft. At its end facing away from the brake disk, said drive element is provided with wrench faces in order to reset the readjustment device back again completely into the starting position by turning back the shaft. Usually this takes place when used-up brake pads are replaced with new brake pads.

The precision and reliability of the readjustment is substantially dependent on the avoidance of canting of the elements of the readjustment device involved. For this purpose, the shaft, on which the elements of the readjustment device are arranged, is supported in the brake housing in the case of EP 0 531 321 B1 so that it can perform slight self-aligning movements. For this purpose, the shaft is supported in an opening of the brake housing via a cardanic pivot bearing. A bush comprised of an inner steel ring, an outer steel ring and elastically deformable material arranged in between serves as cardanic pivot bearing.

As far as the readjustment device is concerned, the adjustment device according to EP 0 531 321 B1 is composed of many components and elements which requires a correspondingly expensive assembly.

The invention is based on the object of further developing the mentioned adjustment device so that the same can be produced more cost-effectively and manages to get by with fewer components.

SUMMARY OF THE INVENTION

For solving this object, an adjustment device for a vehicle disk brake is proposed that is characterized in that the steel ring is slide-moveably supported against a cylindrical bearing section of the shaft, in that on the axis a coupling comprised of a first coupling part that is rotationally fixed relative to the shaft and a second coupling part that is rotationally fixed relative to the steel ring is arranged, and in that the second coupling part is a coupling ring that is rotatably mounted relative to the shaft.

The mentioned object is likewise solved through suitably designed components or component groups of the adjustment device, namely by a cardanic pivot bearing characterized in that the first steel ring is provided with a step in such a manner that it has a longitudinal section of smaller inner diameter, on which the cylindrical slide bearing surface is located, and a longitudinal section of larger inner diameter, on which a sealing lip projecting over the cylindrical slide bearing surface is located on the inside and by a coupling ring characterized in that the further annular surface is arranged conically with respect to the axis of the ring, and in that the annular opening over its circumference is provided with first circumferential sections projecting radially to the axis and with second circumferential sections which recede compared with the former, which alternate with one another.

The fact that a steel ring of the cardanic pivot bearing is slide-moveably supported directly against a cylindrical bearing section, with which the shaft is provided, contributes to the constructional simplification. The fact that on the axis of the readjustment device a rotary coupling comprised of a first coupling part that is rotationally fixed relative to the shaft and a second coupling part that is rotationally fixed relative to the steel ring of the cardanic pivot bearing is arranged, wherein the second coupling part is a separate coupling ring that is rotatably mounted on the central shaft further contributes to the constructional simplification. Said coupling ring is preferentially formed axially moveably relative to the steel ring of the cardanic pivot bearing.

According to a preferred configuration of the adjustment device, an axially-acting spring element is arranged between the coupling ring and the cardanic pivot bearing. A shaft spring is particularly suitable here as spring element.

According to a further configuration, the steel ring is rotationally fixed relative to the coupling ring via positively locking elements. Arms formed on the steel ring, which extend in the axial direction of the shaft, can serve as positively locking elements, wherein these arms are preferentially separated from one another by axially extending slots.

The insides of the arms jointly form a cylindrical inner contour, with which the arms are supported areally on the cylindrical bearing section of the shaft, so that a relatively large slide bearing surface and thus a particularly low-friction sliding of the faces concerned that is unsusceptible to wear is achieved.

When the first coupling part is a radially expanded collar, which is molded onto the shaft in one piece, it contributes to the reduction of parts. Preferentially, this collar is arranged on the shaft following the cylindrical bearing section.

Preferentially, the central shaft assumes a dual function in that, on the one hand, it receives and positions elements of the readjustment device on a common axis, and in that it forms a resetting shaft on the other hand. For this purpose, the shaft is provided with a drive structure for a tool that can be applied thereto in order to reset the readjustment device completely into its starting position by turning back the resetting shaft, which is usually performed when replacing used-up brake pads with new brake pads. For ease of access when applying a suitable tool, the drive structure is preferentially located on the end of the resetting shaft facing away from the brake disk.

Besides, the rubber or elastomer element and the inner steel ring, a further steel ring mounted on the rubber or elastomer ring on the outside, with which the cardanic pivot bearing is seated in the opening of the housing, can be a part of the cardanic pivot bearing.

In order to protect the region of the readjustment from environmental influences, in particular entering of dust or moisture, part of the cardanic pivot bearing additionally is a circumferential sealing lip, which is elastically supported against the resetting shaft. Preferentially, the sealing lip is supported against that cylindrical bearing section of the shaft against which the cardanic pivot bearing also lies in a slide- and pivot-moveable manner.

For the arrangement of the sealing lip it is advantageous when the steel ring of the cardanic pivot bearing is provided with a step in such a manner that it has a longitudinal section of smaller inner diameter, with which it is supported against the cylindrical bearing section of the shaft, and a longitudinal section of larger inner diameter, on which the sealing lip is located on the inside. Here, too, the advantage is a simplification since the cardanic pivot bearing further-developed in this manner simultaneously assumes the task of the sealing.

For realizing the function of a one-way coupling necessary in a readjustment device, the two coupling parts are provided with coupling structures in the form of teeth or ramps that are arranged distributed over the circumference of the coupling parts. The teeth on at least one of the two coupling parts are composed of first flanks, which form the ramps, and second flanks. The first and second flanks alternate with one another, are inclined in opposite directions relative to one another and have a different pitch. The more inclined second flanks are required in order to be able to turn the shaft back for the purpose of returning the readjustment device. Because of the steepness of the second flanks this involves an elevated rotational resistance but one which can be easily overcome with a suitable hand tool. In addition, an inadvertent resetting of the readjustment device is securely prevented by this elevated rotational resistance.

For production reasons it can be advantageous when the number of the ramps on the second coupling part, i.e. the coupling ring, is a whole-number multiple of the number of the ramps on the first coupling part formed directly on the shaft, for production of a relatively fine toothing with many ramps generally results in elevated production costs. The objective of a sufficiently fine division upon readjusting the brake however can already be achieved when only one of the coupling partners involved has a fine toothing with correspondingly many ramps and without just as fine a toothing being realized also on the other coupling partner. By way of the mentioned configuration, the prerequisite is created for being able to produce the shaft in a relatively cost-effective extrusion method. By contrast, the coupling ring having a toothing that is finer by a whole-number multiple is produced more precisely, namely in a sintering method.

With a further configuration it is proposed that the coupling structures are arranged distributed along an annular surface that is conical relative to the axis of the shaft. Preferentially, the cone angle of the conical annular surface with respect to the axis of the shaft is between 55° and 65°.

With regard to the coupling ring forming the second coupling part it is advantageous when the annular surface comprising the toothing or the ramps thereof is arranged conically, and when the annular opening of the coupling ring over its circumference is provided with first circumferential sections projecting radially to the axis and with second circumferential sections which recede compared with the former, which alternate with one another. By way of the first circumferential sections, the rotary coupling between the coupling ring and the cardanic pivot bearing is achieved in this case.

BRIEF DESCRIPTION OF THE DRAWINGS

In the following, an exemplary embodiment is described by way of the drawings and further advantages are stated. It is shown in.

DESCRIPTION OF PREFERRED EMBODIMENTS

Figure 1:
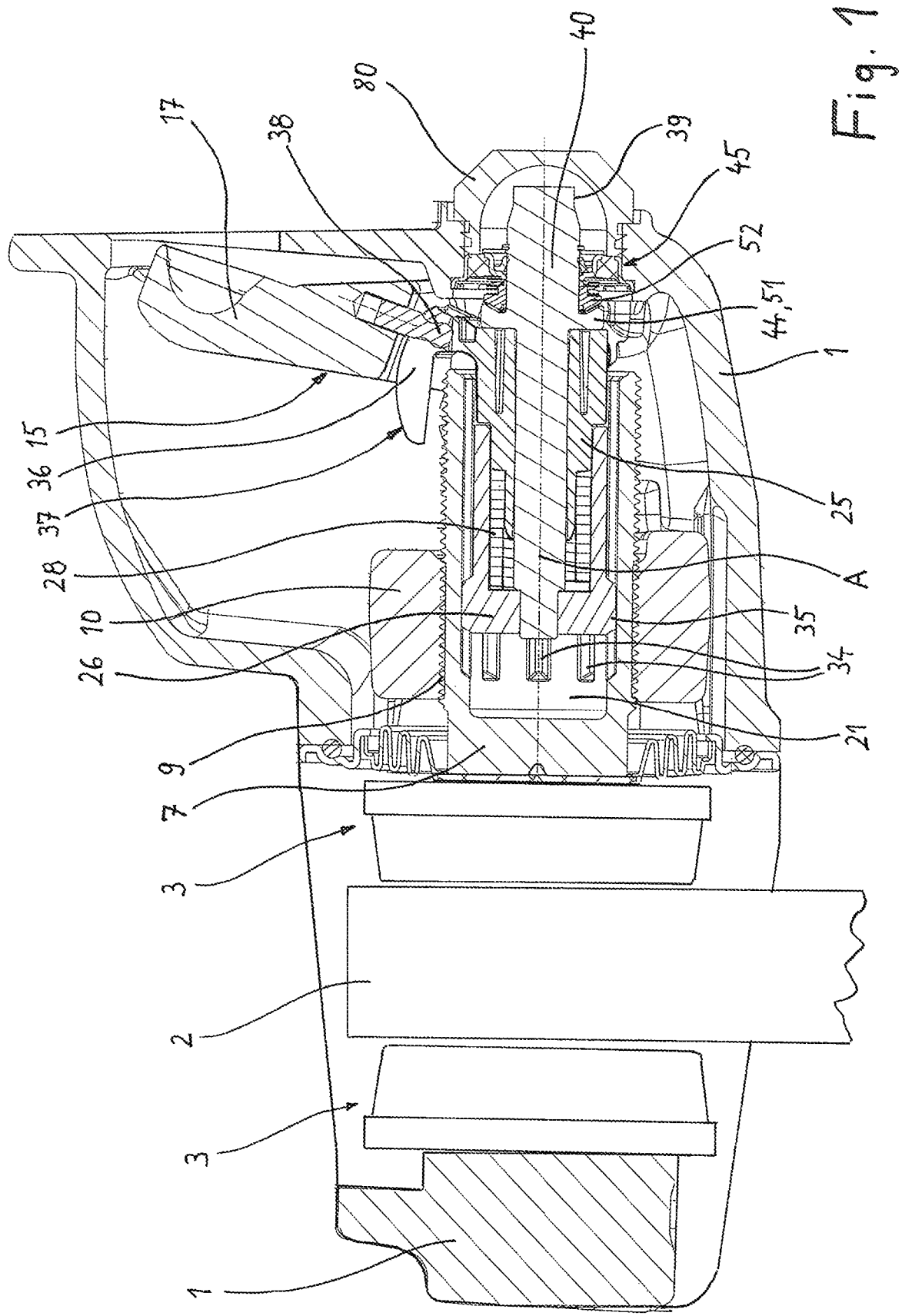
FIG. 1 a longitudinal section through a vehicle disk brake provided with a readjustment device along the brake clamping axis.

In an overview representation, FIG. 1 shows a compressed air-actuated disk brake with an integrated device for readjusting the wear-induced clearance of the brake. Such a device is employed for example in a sliding caliper disk brake intended for commercial vehicles for offsetting the brake pad wear accompanying the driving operation, but also the wear on the brake disk.

Together with elements of the brake clamping, the readjustment device is arranged in a brake housing 1, which can for example be the brake caliper of the disk brake.

The brake disk 2 which is shown in FIG. 1 in the form of an extract and connected to the vehicle wheel furthermore is part of the disk brake, against which a brake pad 3 works on each of its two sides in each case. The same is composed in the usual manner of a pad back plate and the actual friction lining.

The direct loading of the inner brake pad 3 with brake pressure is effected by a thrust piston 7 that is moveable against said brake pad, which during the brake clamping lies against the pad back plate of this inner brake pad 3. The thrust piston 7 is in a threaded connection 9 with a thrust piece 10 that is suitable for transmitting the full braking forces, which thrust piece 10 is arranged longitudinally moveably in the brake caliper 1.

A clamping lever 15 is supported against the thrust piece 10. The clamping lever 15 is mounted in the brake housing 1 on a pivot axis that is parallel to the brake faces of the brake disk 2, and it is provided with a lever arm 17. The force member of the vehicle brake works against the lever arm 17. In the case of a compressed air-actuated disk brake, this force member is a pneumatic cylinder. The force generated by the force member is converted into a pivoting of the clamping lever 15 via the lever arm 17, as a result of which because of the lever conditions, a pressure amplifying the force of the force member on the thrust piece 10 occurs. The arrangement of the force member, the lever arrangement and the thrust piece forms the clamping device of the vehicle brake.

For the pressure amplification, the clamping lever 15 operates as a cam. A fork-shaped design of the clamping lever 15 is shown. With this design, the actuation force and thus the braking force is transmitted onto the thrust piece 10 in equal parts and on both sides of the readjustment device centrally arranged on the axis A.

In the unbraked state, a distance (clearance) between the brake disk 2 and each of the two brake pads 3 exists in each case, so that the parts do not rub against one another. The readjustment device serves for offsetting the clearance which is ever more enlarged through the wear on the pads and the brake disk. For a simple and compact design of the brake, this is at least partially integrated in the thrust piston 7 arranged centrally in the brake housing 1. For this purpose, the thrust piston 7 is provided with a hollow space 21 for at least parts of the readjustment device that is open facing away from the brake disk. Facing the brake disk 2, the thrust piston 7 by contrast is closed.

A part of the readjustment device is a drive element 25 which is rotatably arranged within the housing of the disk brake on an axis A that is parallel to the axis of rotation of the brake disk. During the brake actuation by the clamping device of the brake and in particular through the action of the clamping lever 15, the drive element 25 is rotatable about the axis A.

Parts of the readjustment device are, furthermore, a readjustment element 26 arranged on the same axis A, and furthermore a transmission device in the movement path between drive element 25 and readjustment element 26. By means of the transmission device, the readjustment element 26 can be gradually offset by the drive element 25 into pivot movements about the axis A in the same direction in each case. As transmission device, a loop spring 28 is employed here, which is likewise arranged on the axis A.

With regard to the surrounding thrust piston 7, the readjustment element 26 is rotationally fixed but axially moveable. For this purpose, the thrust piston 7 on its inside is provided with longitudinal grooves 34, in which protrusions or lugs 35 molded onto the readjustment element 26 on the outside are guided in a longitudinally moveable manner. A non-rotatable longitudinal guidance of the readjustment element 26 relative to the thrust piston 7 is achieved. By the relatively short lugs 35 in the longitudinal direction, a slight pivot movement that is unavoidable during the brake clamping can be offset.

Figure 3:
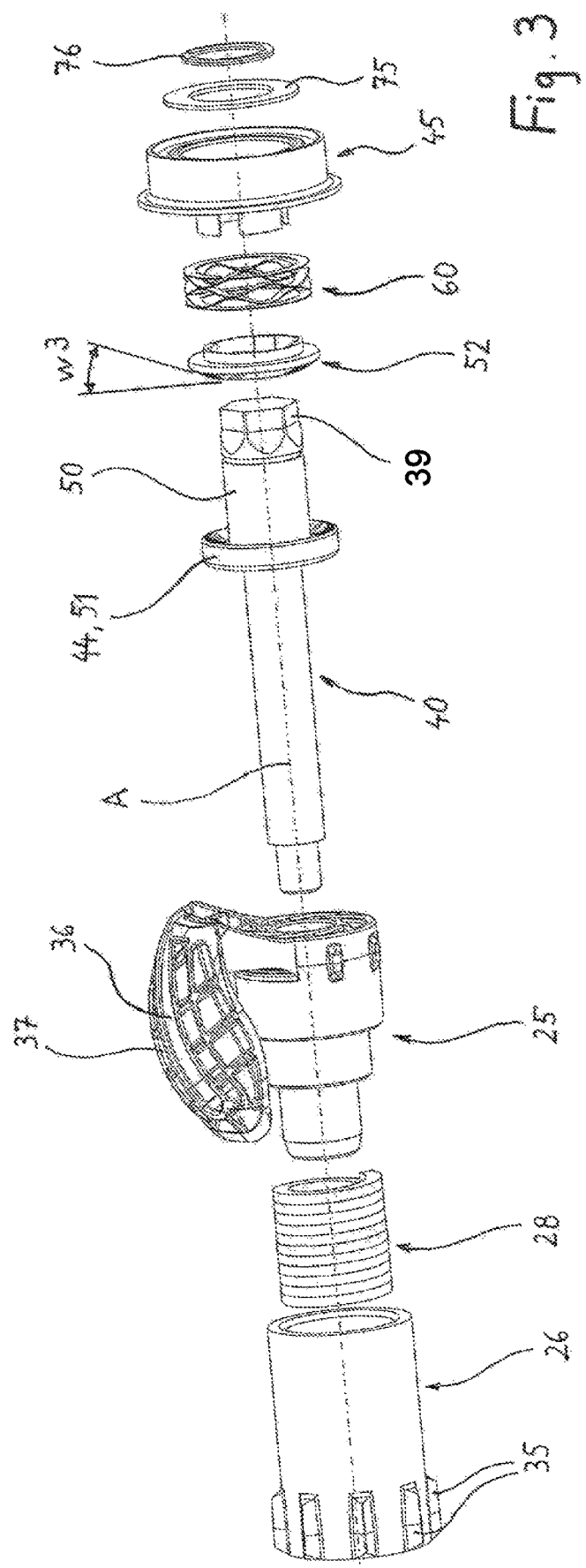
FIG. 3 in an exploded representation the individual parts of the readjustment device.

The drive element 25, based on the brake housing 1, is arranged substantially fixed in place in the longitudinal direction of the axis A. The drive element 25 is provided with an arm 37 protruding to the outside. The arm 37 forms a motion link 36 (FIG. 3) into which a pin 38 arranged on the clamping lever 15 engages. The motion link 36 on the arm 37 and the pin 38 together form a transmission via which the drive element 25 can be driven by the movement of the clamping lever 15. The pivoting of the clamping lever 15 leads to rotation of the drive element 25 about the axis A.

For a primarily axial design of the readjustment device, both the drive element 25 as well as the readjustment device 26 are located on a shaft 40 centrally arranged on the axis A. The shaft 40 is axially substantially immovable with regard to the housing 1, but rotationally moveable with regard to the housing 1.

The readjustment element 26 is fixedly connected and in particular rotationally fixedly connected to the shaft 40. The drive element 25 is rotationally moveably mounted on the shaft 40 and is additionally rotatable relative to the readjustment element 26.

At its end facing away from the brake disk 2 the shaft 40 is provided with a polygon 39 as wrench face. A tool can be started thereon in order to again completely reset the readjustment device into its starting position by turning back the shaft 40, which usually takes place when replacing used-up brake pads with new brake pads. After the replacement of old with new brake pads 3 at the latest, the readjustment has to be manually moved back into its starting position. For this purpose the shaft 40 and thereby simultaneously the readjustment element 26 and the thrust piston are rotated in a direction of rotation that is opposite to the direction of rotation gradually occurring during the readjustment.

The rotational movement during the resetting is not transmitted to the drive element 25 since a coil section of the loop spring 28 in this case is diminished and this coil section slips through in the readjustment element 26 in the manner of a freewheel.

The loop spring 28 serving for the rotational transmission between drive element 25 and readjustment element 26 can combine within it the functions of a one-way coupling with the function of an overload coupling. Details of the loop spring 28 and its function are described in the patent application WO 2015/117601 A1.

The shaft 40 is supported twice relative to the brake housing 1, namely in each case indirectly. The first support is effected via the readjustment element 26 which in turn is guided in the thrust piston 7, which in turn is supported, via the threaded connection 9, in the thrust piece 10. The second support is effected at the other end, i.e. the end facing away from the brake disk. There, the shaft 40 is supported indirectly according to FIG. 2, namely via a cardanic pivot bearing 45, in a round opening 1A of the brake housing 1. As bearing bush, the cardanic pivot bearing 45 is designed so that it does not enforce any exact axial alignment of the shaft 40 but instead makes possible a slight self-aligning of the shaft 40 relative to the housing 1.

Figure 2:
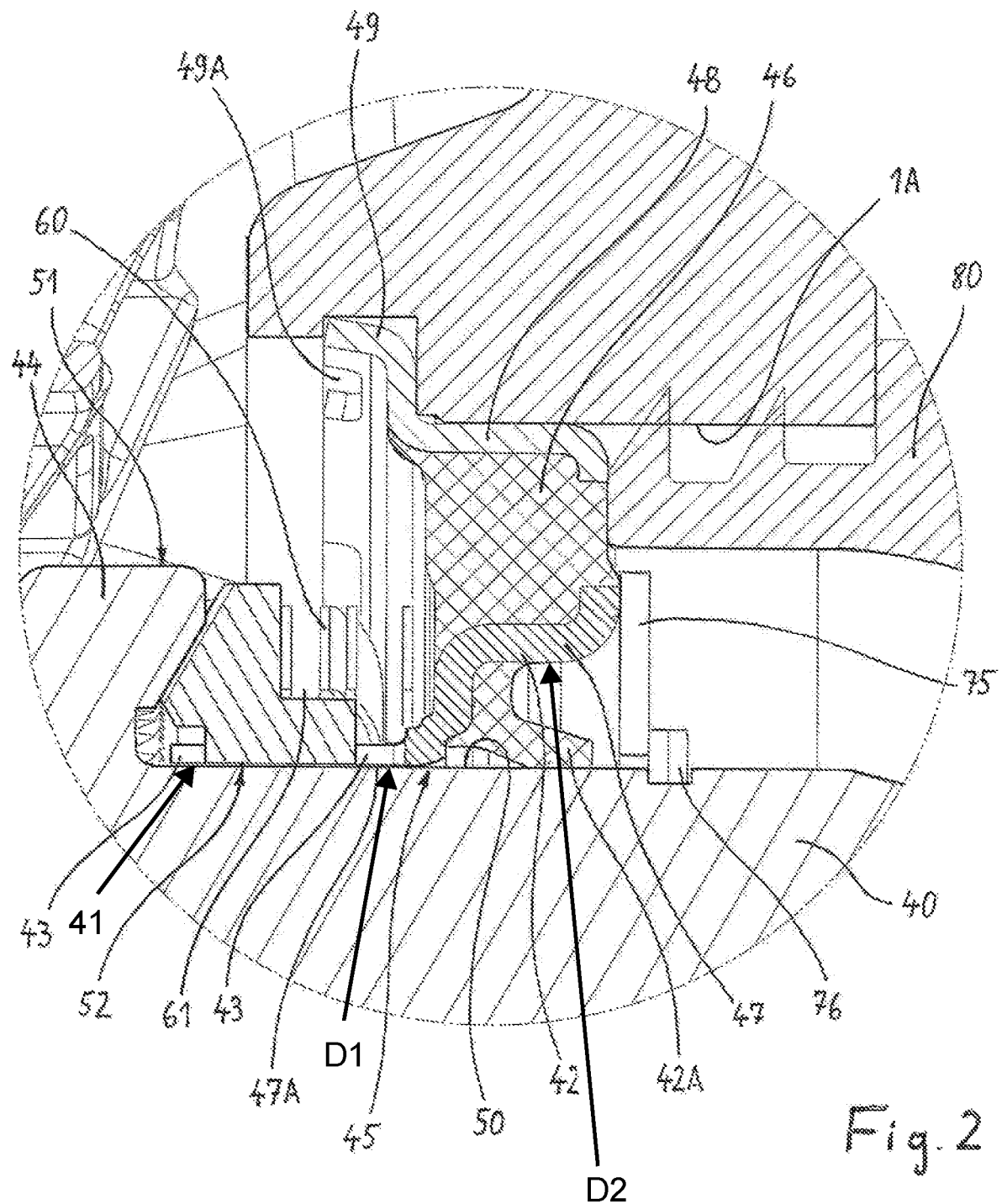
FIG. 2 the detail marked "II" in FIG. 1 to an enlarged scale.

According to FIG. 2 this is achieved in that an elastically deformable rubber or elastomer ring 46, on the inside of which a steel ring 47 is mounted, for example by vulcanizing, is part of the cardanic pivot bearing 45. The steel ring 47 has an altogether cylindrical inner contour which forms a cylindrical slide bearing surface 47A, with which the steel ring 47 slide-moveably supports itself against a cylindrical bearing section 50 of the shaft 40.

An outer steel ring 48, which is preferentially likewise connected to the rubber or elastomer ring 46 by vulcanization is additionally part of the cardanic pivot bearing 45 configured as bearing bush. With the outer steel ring 48, the cardanic pivot bearing 45 is seated in the surrounding opening 1A of the housing 1. The two steel rings 47, 48 have no direct contact since the elastically yielding material of the rubber or elastomer ring 46 is located between them.

The outer steel ring 48 is supported with a part of its axial length against the cylindrical housing opening 1A and tightly held therein by frictional connection. The steel ring 48 facing the brake disk has an end region 49 which, for reducing the strength, is provided with axially extending slots 49A and is slightly deformed towards the outside.

The end region 49 makes it possible to fix in the longitudinal direction the cardanic pivot bearing 45 in the manner of a detent behind an undercut in the housing 1 formed next to the housing opening 1A.

The inner steel ring 47 is provided with a step in such a manner that the inner steel ring 47 has a longitudinal section 41 of smaller inner diameter D1 (FIG. 4) on which the slide bearing surface 47A for lying against the cylindrical bearing section 50 of the shaft is located, and a second longitudinal section 42 of larger inner diameter (D2, see FIG. 2). On the longitudinal section 42 of larger inner diameter D2, a sealing lip 42A is mounted on the inside by vulcanization, which seals relative to the cylindrical bearing section 50 of the shaft 40. In this way, no moisture and no dust can enter the region of the pivot mounting. A shaft sealing ring can be employed as alternative and to avoid vulcanization.

On the longitudinal section 41 of smaller diameter, the steel ring 47 is axially extended in the form of a cylinder and here provided with axial slots 43, i.e. slots 43 extending parallel to the axis A. As a consequence of the slots 43, the steel ring 47 comprises individual arms on the longitudinal section 41 (FIG. 4) that are separated from one another by the slots 43, which extend axially. The insides of these arms jointly form a part of that cylindrical slide bearing surface 47A, with which the steel ring 47 is slide-moveable on the cylindrical bearing section 50 of the shaft 40.

The arms which are separated from one another by the slots 43 and extend axially have a cylindrical inner contour on their insides when jointly viewed, so that an areal support on the cylindrical bearing section 50 is created here.

This configuration of the inner steel ring 47 results in relatively large contact areas between the slide bearing surface 47A formed on the steel ring 47 and the cylindrical bearing section 50 of the shaft, as a result of which a good sliding behavior with low susceptibility to wear is achieved.

Figure 4:
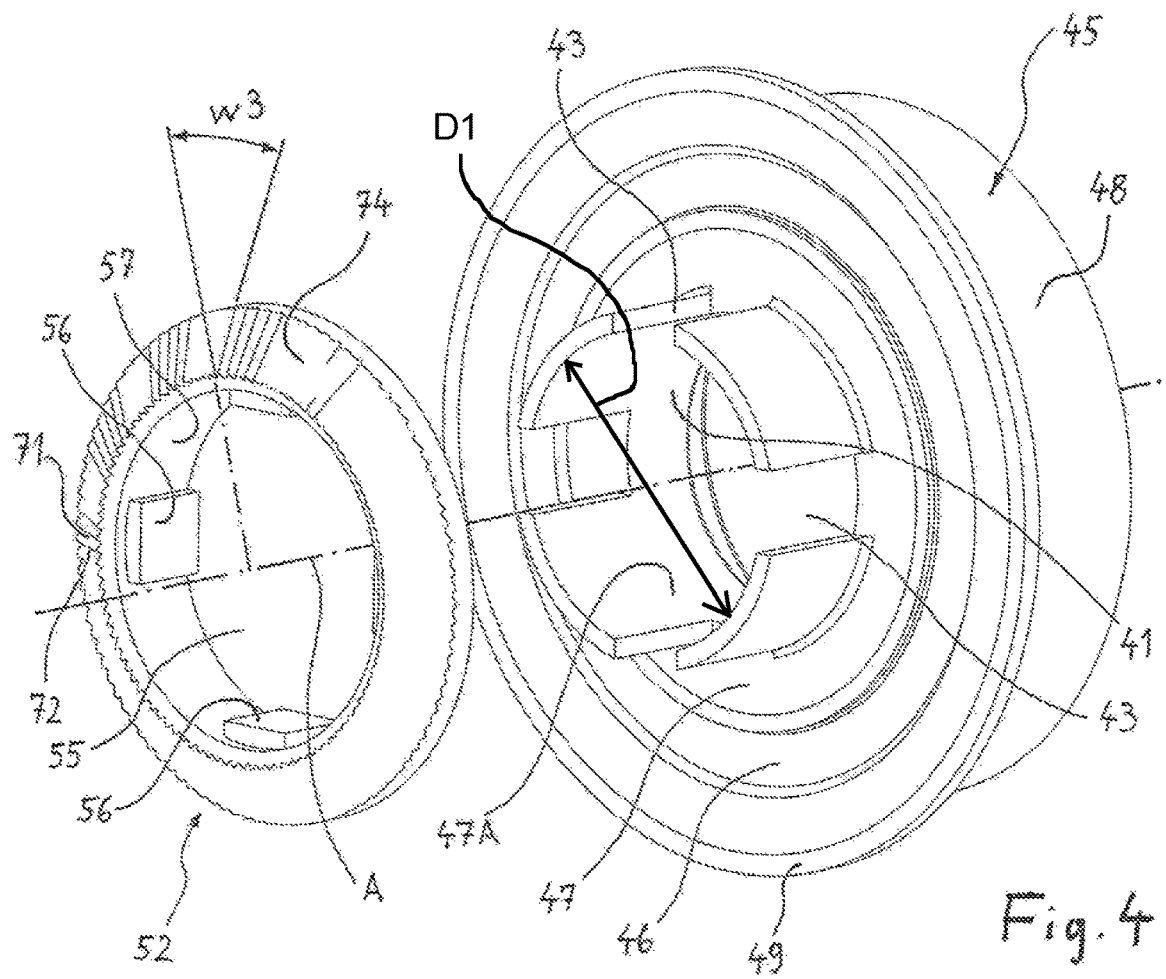
FIG. 4 in an exploded representation a cardanic pivot bearing, and shown axially separately, a coupling ring of a one-way coupling, and FIG. 5 the coupling ring of the one-way coupling seen from another perspective and FIG. 5a showing a detail of the tooth-shaped coupling structure.
Figure 5:
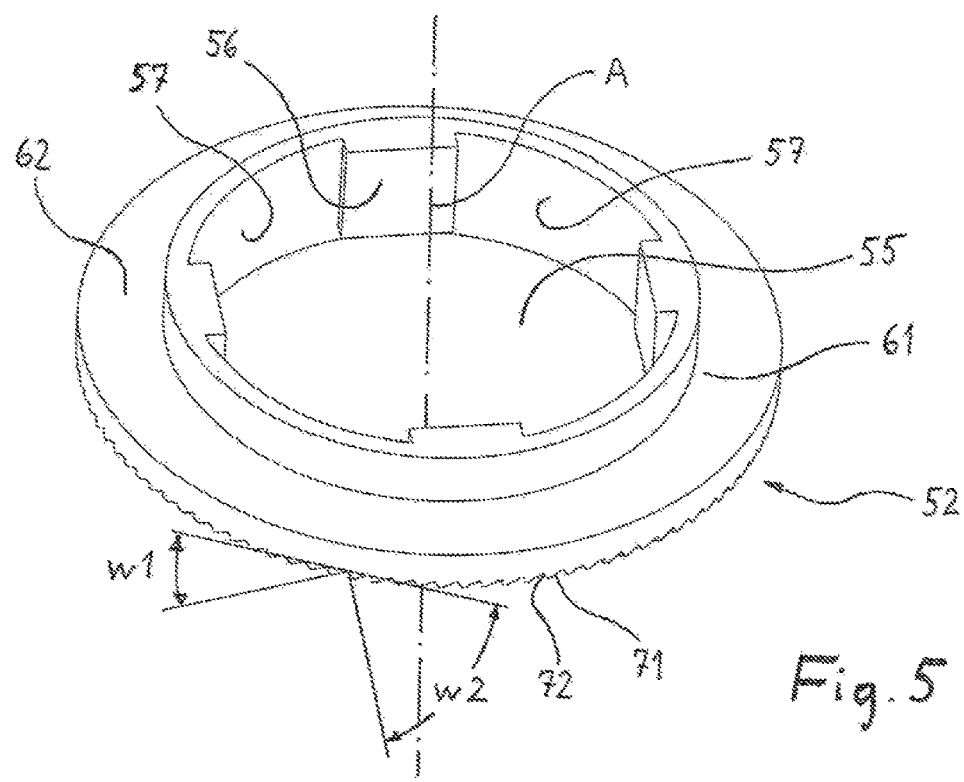
Figure 5A:
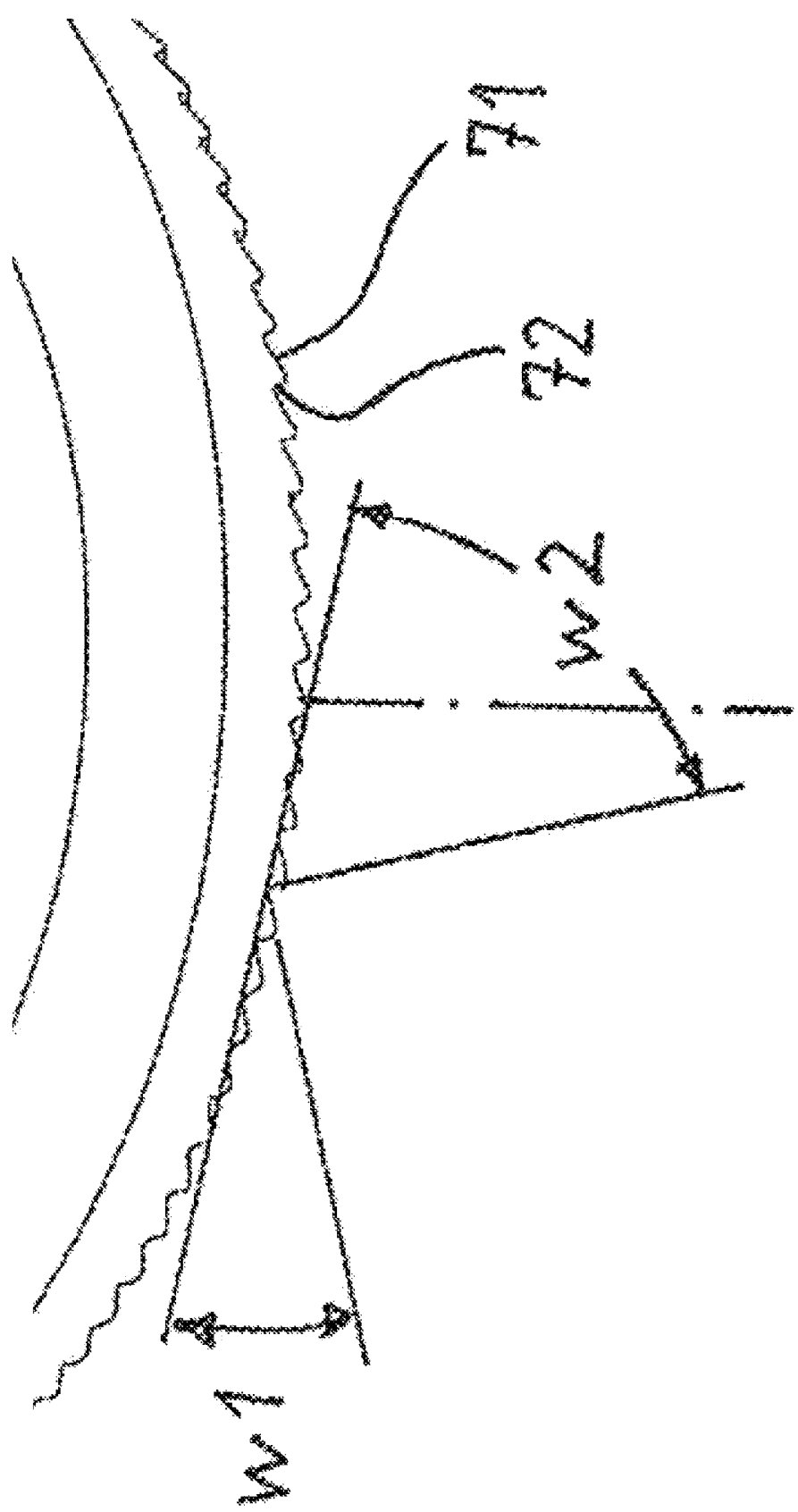

Especially from the FIGS. 4 and 5 it is evident that the slots 43 together with the arms so formed, form positively locking elements through which a rotationally fixed connection of the steel ring 47 with a separate coupling ring 52 is achieved. For this purpose, the coupling ring 52 is provided with corresponding positively locking elements on its annular opening 55, namely with first circumferential sections 56 that alternately project to the inside towards the axis A and second circumferential sections 57, which recede compared with the former, i.e. which alternate with one another. By way of this, a pure rotary coupling is achieved, i.e. which allows a free longitudinal movement of the coupling ring 52 relative to the inner steel ring 47.

The coupling ring 52 surrounds the shaft 40 and in part also the steel ring 47 and forms the one part of a rotary coupling, which altogether is composed of a first coupling part 51 and the coupling ring 52 as second coupling part. Here, the first coupling part 51 is a collar 44 that is radially expanded compared with the bearing section 50 and molded onto the shaft 40 in one piece.

A spring element 60, which is configured as shaft spring, supports itself on the one hand against the cardanic pivot bearing 45 and here preferentially against the inner steel ring 47 of the same, and on the other hand against the coupling ring 52. For this purpose, the coupling ring 52 is provided with a circumferential step 61, which partly accommodates and centers the shaft spring 60 with respect to the axis A. Here, the spring supports itself against an end-face annular surface 62 on the step 61. The spring 60 ensures that the coupling ring, as second coupling part 52, is permanently preloaded against the first coupling part 51 formed on the shaft 40.

Both coupling parts 51, 52 are provided with toothed coupling structures in the form of teeth or ramps which are arranged evenly distributed over the circumference of the coupling parts.

In this respect, FIG. 5 shows that the tooth-shaped coupling structures are composed of first flanks 71, which form the ramps, and second flanks 72, wherein the first flanks 71 and the second flanks 72 alternate with one another, have an opposite inclination and above all have a different inclination or flank angle, since the flank angle w1 of the first flanks 71 forming the ramps amounts to approximately 30° and maximally 45°. By contrast, the flank angle w2 of the opposite flanks 72 amounts to between 60° and 80° and preferentially 70°.

The flatter flanks 71 are significant during the readjustment in that the teeth gradually migrate corresponding to the wear of the disk brake, wherein the ramps rise up on one another and, in the case where the ramps are overcome, switch further by a tooth as a result of which the readjustment is concluded.

The steeper flanks 72 by contrast are not directly significant during the readjustment but in this regard serve only as detents, i.e. lock against unintentional turning back.

On the other hand, the second flanks 72 are inclined at least so far that they can be overcome with conscious increased exertion of force. This is the case during the resetting of the readjustment device by turning the shaft 40 by means of a tool started on the polygon 39 of the same. By way of the tool, sufficient torque can be built-up in order to turn back the rotary coupling comprised of the coupling parts 51, 52 against the readjustment direction. This meets with success when the second flank angle w2 is between 60° and 80°.

It is advantageous that the annular surfaces with the coupling structures are not arranged at a right angle to the axis A, but inclined. For this purpose, the annular surface 74 of the coupling ring 52, on which the teeth or ramps are formed, is arranged conically corresponding to the entered angle w3. The other coupling part 51, i.e. the toothing directly formed on the collar 44 of the shaft, also has the angle w3.

Preferentially, the cone angle measured between the annular surface 74 and the axis A amounts to between 55° and 65°.

In terms of production it is advantageous when the number of the teeth or ramps on the second coupling part 52 is a whole-number multiple of the number of the teeth or ramps on the first coupling part 51. This is a prerequisite in order to cost-effectively produce the shaft 40 in an extrusion method, in which very fine structures cannot be easily produced.

Only the coupling ring 52, which has the toothing that is finer compared with this with a division, i.e. a tooth spacing of for example only 3.6°, demands a production method which makes possible finer structures. Suitable in this regard is a sintering method for example.

To axially fix the shaft 40 on the cardanic pivot bearing 45, the inner steel ring 47 supports itself against an annular disk 75, which in turn is secured by a locking ring 76, which is seated in a groove on the outer circumference of the shaft 40.

A cap 80 comprised of a soft plastic can be fitted onto the housing opening 1A from the outside in order to additionally close off the same. This closure cap 80 contributes to preventing entering of moisture and dust in the region of the pivot mounting and likewise in the region of the readjustment.

LIST OF REFERENCE CHARACTERS

1 Housing, brake caliper
1A Housing opening
2 Brake disk
3 Brake pad
7 Thrust piston
9 Threaded connection
10 Thrust piece
15 Clamping lever
17 Lever arm
21 Hollow space
25 Drive element
26 Readjustment element
28 Loop spring
34 Longitudinal groove
35 Lug
36 Motion link
37 Arm
38 Pin
39 Polygon
40 Shaft
41 Longitudinal section
42 Longitudinal section
42A Sealing lip
43 Slot
44 Collar
45 Cardanic pivot bearing
46 Rubber or elastomer ring
47 Steel ring
47A Slide bearing surface
48 Steel ring
49 End region
49A Slot
50 Bearing section
51 First coupling part
52 Second coupling part, coupling ring
55 Annular opening
56 Circumferential section
57 Circumferential section
60 Spring element, shaft spring
61 Step
62 Face-end annular surface
71 Flank
72 Flank
74 Annular surface
75 Annular disk
76 Locking ring
80 Cap, closure cap
A Axis
w1 Flank angle
w2 Flank angle
w3 Cone angle

What is claimed is:

1. An adjustment device for a vehicle disk brake, which, for offsetting an operationally-induced wear on brake pads and a brake disk of the vehicle disk brake, is provided with a readjustment device, wherein parts of the readjustment device comprise:
   a drive element (25), which is rotatably arranged within a housing of the disk brake on a central axis (A) of the adjustment device, and which can be set in rotation by a brake clamping device,
   a shaft (40) centrally arranged on the central axis (A), relative to which the drive element (25) is rotatably mounted,
   a cardanic pivot bearing (45) which is capable of self-aligningly supporting the shaft (40) in an opening (1A) of the housing, which consists at least of a deformable rubber or elastomer ring (46) and a steel ring (47) fastened therein,
characterized in that the steel ring (47) is slide-moveably supported against a cylindrical bearing section (50) of the shaft (40), in that on the central axis (A) a coupling comprised of a first coupling part (51) that is rotationally fixed relative to the shaft (40) and a second coupling part (52) that is rotationally fixed relative to the steel ring (47) is arranged, and in that the second coupling part is a coupling ring (52) that is rotatably mounted relative to the shaft (40).

2. The adjustment device as claimed in claim 1, characterized in that the coupling ring (52) is formed axially moveably relative to the steel ring (47).

3. The adjustment device as claimed in claim 2, characterized by an axially-acting spring element (60) between the coupling ring (52) and the steel ring (47).

4. The adjustment device as claimed in claim 3, characterized by a shaft spring as spring element (60).

5. The adjustment device as claimed in claim 1, characterized in that the steel ring (47) is rotationally fixed relative to the coupling ring (52) via positively locking elements.

6. The adjustment device as claimed in claim 5, characterized in that the positively locking elements are arms which extend axially and are separated from one another by axially extending slots (43), wherein the insides of the arms jointly form a cylindrical inner contour, with which the arms are supported areally on the cylindrical bearing section (50) of the shaft (40).

7. The adjustment device as claimed in claim 1, characterized in that the first coupling part (51) is a radially expanded collar (44) of the shaft (40).

8. The adjustment device as claimed in claim 7, characterized in that the collar (44) is arranged on the shaft (40) following the cylindrical bearing section (50).

9. The adjustment device as claimed in claim 1, characterized in that for resetting the readjustment device the shaft (40) is provided with a drive structure (39) for a tool that can be applied thereto.

10. The adjustment device as claimed in claim 9, characterized in that the drive structure (39) is located on the end of the shaft (40) facing away from the brake disk.

11. The adjustment device as claimed in claim 1, characterized in that part of the cardanic pivot bearing (45) additionally is a further steel ring (48) mounted on the rubber or elastomer ring (46) on the outside, with which the cardanic pivot bearing is seated in the opening (1A) of the housing.

12. The adjustment device as claimed in claim 1, characterized in that part of the cardanic pivot bearing (45) additionally is a circumferential sealing lip (42A), which is elastically supported against the shaft (40).

13. The adjustment device as claimed in claim 12, characterized in that the steel ring (47) is provided with a step in such a manner that it has a longitudinal section (41) of smaller inner diameter (D1), with which it is supported against the cylindrical bearing section (50) of the shaft (40), and a longitudinal section (42) of larger inner diameter (D2), on which the sealing lip (42A) is located on the inside.

14. The adjustment device as claimed in claim 1, characterized in that the two coupling parts (51, 52) are provided with coupling structures in the form of ramps (71) that are arranged distributed over the circumference of the coupling parts.

15. The adjustment device as claimed in claim 14, characterized in that the coupling structures on at least one of the coupling parts (51, 52) are composed of first flanks (71), which form the ramps, and second flanks (72), wherein the first and second flanks alternate with one another, are inclined in opposite directions relative to one another and have a different pitch.

16. The adjustment device as claimed in claim 14, characterized in that the number of the ramps (71) on the second coupling part (52) is a whole-number multiple of the number of the ramps (71) on the first coupling part (51).

17. The adjustment device as claimed in claim 16, characterized by a shaft (40) produced in an extrusion method, wherein the first coupling part (51) is a radially expanded collar (44) of the shaft (40).

18. The adjustment device as claimed in claim 16, characterized by a coupling ring (52) produced in a sintering method.

19. The adjustment device as claimed in claim 14, characterized in that the coupling structures on both coupling parts (51, 52) are arranged distributed along an annular surface that is conical relative to the central axis (A).

20. The adjustment device as claimed in claim 19, characterized in that the cone angle between the conical annular surface and the cylindrical bearing section (50) of the shaft (40) is 55°-65°.

21. A cardanic pivot bearing (45) comprised of a deformable rubber or elastomer ring, which on the inside is connected by vulcanization to a first steel ring (47) with a cylindrical slide bearing surface (47A) formed on the inside of the same, and on the outside is connected to a second steel ring (48) for fastening the pivot bearing in an assembly opening, characterized in that the first steel ring (47) is provided with a step in such a manner that it has a longitudinal section (41) of smaller inner diameter (D1), on which the cylindrical slide bearing surface is located, and a longitudinal section (42) of larger inner diameter (D2), on which a sealing lip (42A) projecting over the cylindrical slide bearing surface (47A) is located on the inside.

22. The cardanic pivot bearing as claimed in claim 21, characterized in that, on the longitudinal section (41) of smaller diameter (D1), arms separated from one another by axially extending slots (43) are formed, the insides of which together form at least one part of the cylindrical slide bearing surface (47A).

23. The cardanic pivot bearing as claimed in claim 22, characterized in that the slots (43) and that the arms each have the same width in the circumferential direction.

24. A coupling ring (52) with an annular opening, a face-end annular surface (62) and at least one further annular surface (74), which is provided with coupling structures in the form of ramps (71) that are arranged evenly distributed over the circumference, characterized in that the further annular surface (74) is arranged conically with respect to the central axis (A) of the ring, and in that the annular opening over its circumference is provided with first circumferential sections (56) projecting radially to the central axis (A) and with second (57) circumferential sections which recede compared with the former, which alternate with one another, wherein the coupling structures are composed of first flanks (71), which form the ramps, and second flanks (72), wherein the first and second flanks (71, 72) alternate with one another, are inclined in opposite directions relative to one another, and have a different pitch.

25. The coupling ring as claimed in claim 24, characterized in that the first (56) and the second (57) circumferential sections each have the same width in the circumferential direction.

26. The coupling ring as claimed in claim 24, characterized in that a cone angle of the further annular surface (74) to the central axis (A) is 55°-65°.

27. The coupling ring as claimed in claim 24, characterized in that the flank angle (w1) of the first flanks (71) is maximally 45°, and the flank angle (w2) of the second flanks (72) is 60° to 80°.

28. The coupling ring as claimed in claim 24, characterized in that the coupling ring is a sintered ring.

* * * * *